US011469840B1

(12) United States Patent
El Ghazzal

(10) Patent No.: US 11,469,840 B1
(45) Date of Patent: Oct. 11, 2022

(54) SYSTEMS AND METHODS FOR REPAIRING A LIVE VIDEO RECORDING

(71) Applicant: Meta Platforms, Inc., Menlo Park, CA (US)

(72) Inventor: Sammy El Ghazzal, Adliswil (CH)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 17/133,137

(22) Filed: Dec. 23, 2020

(51) Int. Cl.
*H04H 60/32* (2008.01)
*H04L 43/0829* (2022.01)
*H04L 65/80* (2022.01)
*H04L 65/75* (2022.01)

(52) U.S. Cl.
CPC ......... *H04H 60/32* (2013.01); *H04L 43/0829* (2013.01); *H04L 65/75* (2022.05); *H04L 65/80* (2013.01)

(58) Field of Classification Search
CPC ... H04H 60/32; H04L 43/0829; H04L 65/601; H04L 65/80; H04N 21/44008; H04N 21/23418; H04N 21/234; H04N 21/2404; H04N 21/2407; H04N 21/44; H04N 21/4425

See application file for complete search history.

(56) References Cited

U.S. PATENT DOCUMENTS

| | | | |
|---|---|---|---|
| 2011/0225454 A1* | 9/2011 | Fan ..................... | H04N 21/4334 714/15 |
| 2016/0057199 A1* | 2/2016 | Aziz ..................... | H04L 51/32 709/204 |
| 2017/0013406 A1* | 1/2017 | Oliver .................. | H04L 65/608 |
| 2017/0111249 A1* | 4/2017 | Hardt .................... | H04L 43/16 |
| 2018/0211447 A1* | 7/2018 | Spayd ................... | G09B 5/065 |
| 2018/0270517 A1* | 9/2018 | Maillot ............... | H04N 21/4394 |
| 2021/0235166 A1* | 7/2021 | Oishi .................... | G06V 10/82 |

\* cited by examiner

*Primary Examiner* — Nicholas T Corbo
(74) *Attorney, Agent, or Firm* — Sheppard Mullin Richter & Hampton LLP

(57) ABSTRACT

Systems, methods, and non-transitory computer-readable media can be configured to determine an issue associated with a media broadcast during the media broadcast. A copy of a portion of the media broadcast associated with the issue can be stored. A stored media broadcast associated with the media broadcast can be repaired based on the copy of the portion of the media broadcast.

20 Claims, 9 Drawing Sheets

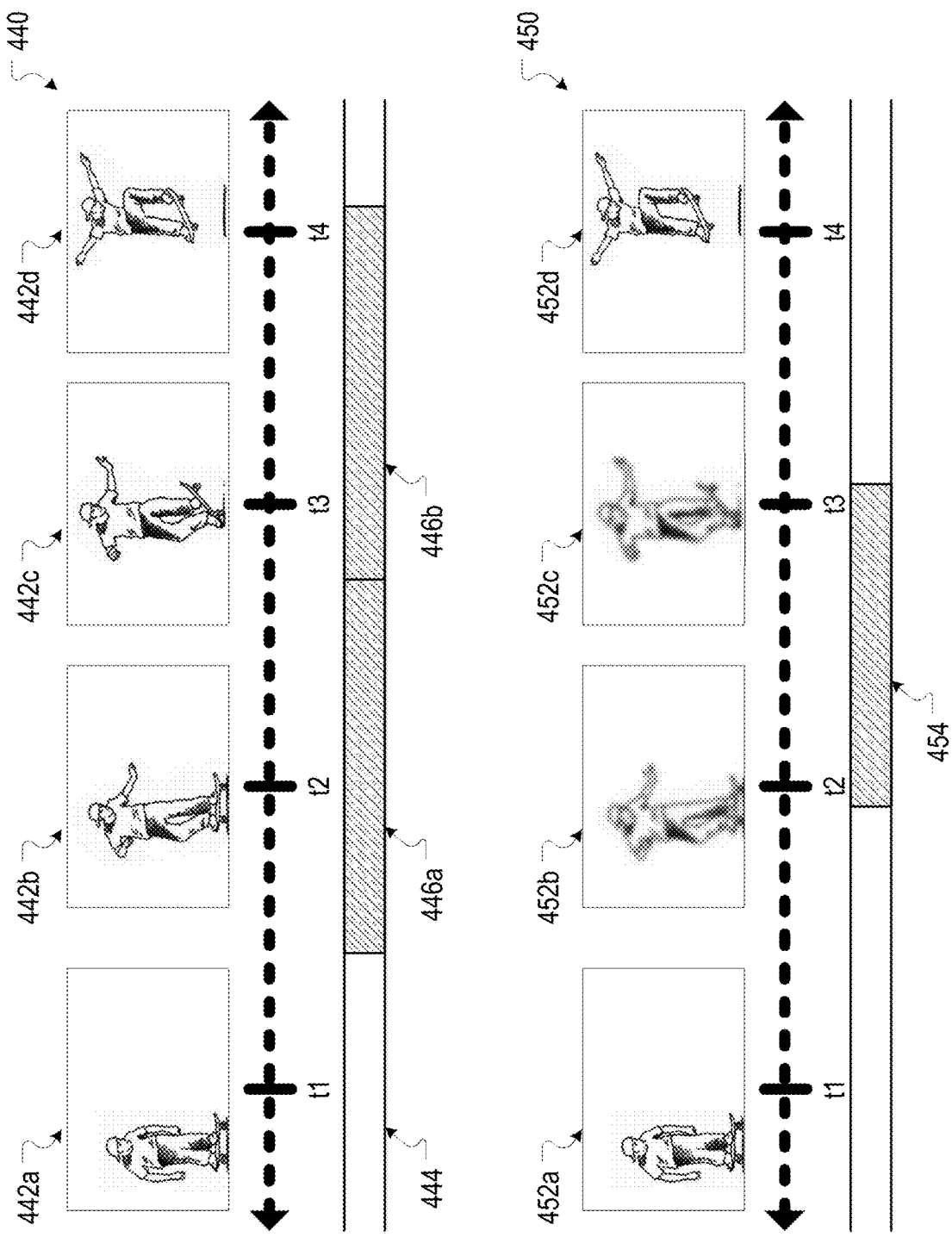

US 11,469,840 B1

SYSTEMS AND METHODS FOR REPAIRING A LIVE VIDEO RECORDING

FIELD OF THE INVENTION

The present technology relates to the field of digital video processing. More particularly, the present technology relates to repairing a live video recording.

BACKGROUND

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system. Other users may access the social networking system and interact with the shared content item. In some instances, a user may broadcast a video through the social networking system.

SUMMARY

Various embodiments of the present technology can include systems, methods, and non-transitory computer readable media configured to determine an issue associated with a media broadcast during the media broadcast. A copy of a portion of the media broadcast associated with the issue can be stored. A stored media broadcast associated with the media broadcast can be repaired based on the copy of the portion of the media broadcast.

In an embodiment, the determining the issue associated with the media broadcast is based on a difference between a number of packets sent by a broadcasting device and a number of packets received by a broadcasting server exceeding a threshold number of packets.

In an embodiment, the determining the issue associated with the media broadcast is based on a network connection associated with the media broadcast failing to satisfy a threshold connection quality.

In an embodiment, the determining the issue associated with the media broadcast is based on a determination of a drop in quality of the media broadcast.

In an embodiment, the storage of the copy of the portion of the media broadcast is associated with a rolling buffer that stores the portion of the media broadcast.

In an embodiment, a size of the rolling buffer is determined based on at least one of: a network connection, a geographic location, or historical data associated with the computing system.

In an embodiment, the size of the rolling buffer changes during the media broadcast based on a change in available bandwidth.

In an embodiment, the repair of the stored media broadcast includes matching frames of the stored media broadcast with frames of the copy of the portion of the media broadcast.

In an embodiment, the repair of the stored media broadcast includes replacing frames of the stored media broadcast with frames of the copy of the portion of the media broadcast.

In an embodiment, the present technology uses a broadcast device in communication with a broadcast server.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIGS. 4A-4C illustrate example media broadcasts and example stored media broadcasts, according to an embodiment of the present technology.

Figure 1:
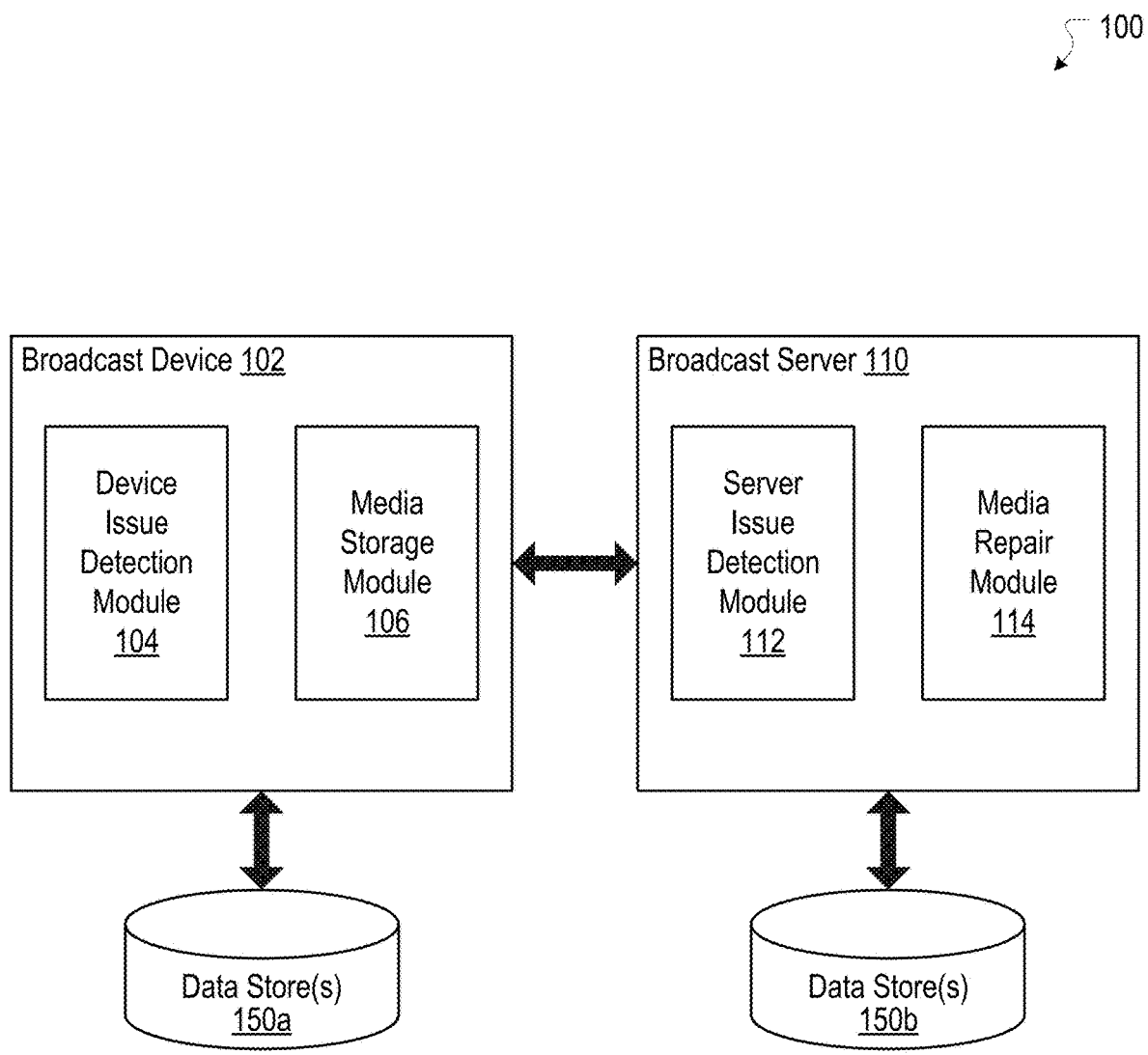
FIG. 1 illustrates an example system including a broadcast device and a broadcast server, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system. Another user may access the social networking system and interact with the shared content item.

Under conventional approaches, users can access a variety of content items, such as images, videos, articles, and links, provided by a social networking system (or service). As an example, a user can broadcast a live video stream via a social networking system, and other users of the social networking system can access the live video stream. After the live video stream ends, the other users can access a stored (e.g., on demand) copy of the live video stream. In some cases, the live video stream may experience interruptions during the broadcast of the live video stream. These interruptions can result from, for example, connectivity or bandwidth issues, and can result in degradations (e.g., artifacts, dropped frames, etc.) in the live video stream. Further, the degradations are recorded in the stored copy of the live video stream. As a result, when the other users access the stored copy of the live video stream, they access a flawed copy of the live video stream that includes the degradations. Thus, conventional approaches pose these and other problems arising in computer technology.

An improved approach rooted in computer technology overcomes the foregoing and other disadvantages associated with conventional approaches specifically arising in the realm of computer technology. In various embodiments, the present technology provides for storing a copy of a portion of a media broadcast associated with a time duration during which an issue with the media broadcast occurred. A stored copy of the media broadcast can be repaired based on the stored copy of the portion of the media broadcast. For example, a broadcast device can provide for broadcast live (or real time) media (e.g., a live video stream) to viewing devices via a broadcast server. The broadcast device can provide the media broadcast to the broadcast server, and the broadcast server, in turn, can provide the media broadcast to the viewing devices. The broadcast server can also store a copy of the media broadcast and generate or record a stored media broadcast (recording of the media broadcast) that is accessible on demand to other devices after the live or real time broadcast of the media broadcast concludes. During the broadcast of the media broadcast, the broadcast device can detect an issue, such as a connectivity issue, associated with the broadcast. For example, the broadcast device can detect that a connection from the broadcast device to the broadcast server has dropped below a threshold connection (e.g., the connection dropped from 4G to 3G). The issue can result in a drop in quality (e.g., dropped frames, reduced resolution, etc.) in the media broadcast that is provided to the broadcast server and the viewing devices. To fix the issue for a recording of the media broadcast, the broadcast device can continuously store the latest portions of the media broadcast in a rolling buffer (e.g., circular buffer, ring buffer, etc.) of an appropriate size. A stored portion of the media broadcast in the rolling buffer can be associated with a time duration during which the issue with the media broadcast occurred. Thus, even if the issue is detected with some delay or lag, the rolling buffer still contains the portion of the media broadcast that corresponds to occurrence of the issue, as discussed in more detail herein. For example, the broadcast device can maintain a rolling buffer that stores the last portion (e.g., last 1 minute, last 30 seconds, etc.) of the media broadcast and, when the issue is detected, more permanently store in a separate data store a copy of the associated portion of the media broadcast that corresponds to occurrence of the issue and that is stored in the rolling buffer. After the media broadcast concludes, the broadcast device can provide the stored copy of the portion of the media broadcast to the broadcast server. The broadcast server can repair the stored media broadcast based on the stored copy of the portion of the media broadcast. When the broadcast server provides the stored media broadcast to the other devices on demand, the drop in quality associated with the issue during the live or real time media broadcast will have been fixed. As repaired, the stored media broadcast provided to the other devices does not include the drop in quality associated with the issue. More details relating to the present technology are provided below.

FIG. 1 illustrates an example system 100 including a broadcast device 102 and a broadcast server 110, according to an embodiment of the present technology. As shown in the example of FIG. 1, the broadcast device 102 can include a device issue detection module 104 and a media storage module 106, and the broadcast server 110 can include a server issue detection module 112 and a media repair module 114. In various embodiments, one or more of the functionalities described in connection with the server issue detection module 112 and/or the media repair module 114 can be implemented in the broadcast device 102, and one or more of the functionalities described in connection with the device issue detection module 104 and the media storage module 106 can be implemented in the broadcast server 110. In some instances, the example system 100 can include a data store 150a in communication with the broadcast device 102 and a data store 150b in communication with the broadcast server 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the device issue detection module 104, the media storage module 106, the server issue detection module 112, and/or the media repair module 114 can be implemented in any suitable combinations.

In some embodiments, the device issue detection module 104, the media storage module 106, the server issue detection module 112, and/or the media repair module 114 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, the device issue detection module 104, the media storage module 106, the server issue detection module 112, and/or the media repair module 114 can be, in part or in whole, implemented as software running on one or more computing devices or systems, such as on a server system or a client computing device. In some instances, the device issue detection module 104, the media storage module 106, the server issue detection module 112, and/or the media repair module 114 can be, in part or in whole, implemented within or configured to operate in conjunction with or be integrated with a social networking system (or service), such as a social networking system 630 of FIG. 6. Likewise, in some instances, the device issue detection module 104, the media storage module 106, the server issue detection module 112, and/or the media repair module 114 can be, in part or in whole, implemented within or configured to operate in conjunction with or be integrated with a client computing device, such as the user device 610 of FIG. 6. For example, the device issue detection module 104, the media storage module 106, the server issue detection module 112, and/or the media repair module 114 can be implemented as or within a dedicated application (e.g., app), a program, or an applet running on a user computing device or client computing system. The application incorporating or implementing instructions for performing functionality of the device issue detection module 104, the media storage module 106, the server issue detection module 112, and/or the media repair module 114 can be created by a developer. The application can be provided to or maintained in a repository. In some instances, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The device issue detection module 104, the media storage module 106, the server issue detection module 112, and/or the media repair module 114 can be configured to communicate and/or operate with the data store 150a and the data store 150b, as shown in the example system 100. The data store 150a and the data store 150b can be configured to store and maintain various types of data. In some implementations, the data store 150a and the data store 150b can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 150a and the data store 150b can store information that is utilized by the device issue detection module 104, the media storage module 106, the server issue detection module 112, and/or the media repair module 114. For example, the data store 150a and/or the data store 150b can store information associated with a media broadcast. It is contemplated that there can be many variations or other possibilities.

In various embodiments, the device issue detection module 104 can determine issues associated with a media broadcast from a broadcast device. As used herein, transmission of media by a broadcast device to a broadcast server for broadcast is referred to as a broadcast or media broadcast by the broadcast device. During the media broadcast, an issue can result in a drop in quality in the media broadcast. In some cases, the issue can be a connectivity issue. Connectivity issues can include, for example, a change in network bandwidth, a change in network connection, or other problems associated with connectivity. As just one example, a change in network connection from 4G to 3G may be associated with a reduction in network bandwidth. Due to the change in the network connection and the associated reduction in network bandwidth, a media broadcast can experience a drop in quality. For example, data associated with the media broadcast can be dropped (or not delivered) or a resolution of the media broadcast can be lowered based on the reduction in network bandwidth. Other technical issues can arise during the media broadcast. For example, another application (e.g., background application) running on the broadcast device can send data during the media broadcast resulting in a reduction in available network bandwidth for the media broadcast. Due to the reduction in available network bandwidth, the media broadcast can experience a drop in quality.

The device issue detection module 104 can determine issues associated with a media broadcast based on monitored conditions associated with a broadcast device. In some cases, connectivity issues can be determined based on numbers of packets sent by a broadcast device to a broadcast server and corresponding responses from the broadcast server to the broadcast device indicating how many packets were received by the broadcast server. In these cases, a connectivity issue can be determined based on a difference between a number of packets sent by the broadcast device and a number of packets received by the broadcast server as indicated in a response, and whether the difference exceeds a threshold number of packets. The difference exceeding the threshold number of packets can indicate that connectivity issues are causing packets to be dropped at a predetermined undesirable level. In some cases, connectivity issues can be determined based on a network connection utilized by a broadcast device. In these cases, a connectivity issue can be determined based on the network connection utilized by the broadcast device failing to satisfy a threshold connection. For example, an EDGE connection can lack the network bandwidth to sufficiently support a broadcast. In this example, a connectivity issue can be determined when a broadcast device drops to an EDGE connection from another network connection (e.g., 4G, 5G, etc.) with higher network bandwidth than the EDGE connection. In some cases, other technical issues can be determined based on a change in a state of a broadcast device. In these cases, a technical issue can be determined based on, for example, a change in processor usage, a change in memory usage, or a launching of another function or application (e.g., background function, background application). For example, an increase in processor usage in a broadcast device can indicate that the broadcast device has experienced a technical issue that can affect a broadcast by the broadcast device. A determination of an issue during a media broadcast can trigger storage of an associated, relevant portion of the media broadcast, as further described herein.

In various embodiments, the server issue detection module 112 can determine issues associated with media broadcast received by a broadcast server. During media broadcast, an issue can result in a drop in quality in the media broadcast received by the broadcast server. The server issue detection module 112 can determine that an issue has occurred based on the drop in quality. In some cases, a drop in quality in a media broadcast can include, for example, dropped video frames, dropped audio frames, reduced video resolution, corrupted video, corrupted audio, and other anomalies. The server issue detection module 112 can determine issues associated with a media broadcast (e.g., in real time, in near real time, or after the media broadcast) received by a broadcast server based on analysis of the received media broadcast. The analysis can be based on audio in the received media broadcast or video in the received media broadcast. For example, an issue associated with a media broadcast can be determined based on a difference in audio levels within a threshold period of time (e.g., a sudden drop in audio amplitude) or based on an audio level falling below a threshold audio level (e.g., silent audio). As another example, an issue associated with a media broadcast can be determined based on a difference in rates of frames of video received within a threshold period of time (e.g., drop in frame rate, drop in frames per second) or based on a lack of video data received (e.g., missing frames). In some cases, the server issue detection module 112 can apply a function or transform (e.g., Fourier transform) to audio of a media broadcast or to frames of a media broadcast. An issue associated with the media broadcast can be determined based on an analysis of the transform of the audio or the frames. For example, an issue can be determined when a difference in the transform exceeding a threshold value occurs within a threshold period of time. For example, a Fourier transform can be applied to audio of a media broadcast. An issue associated with the media broadcast can result in a sudden, undesired drop in the audio. The issue associated with the media broadcast can be determined when a difference in a Fourier coefficient associated with the audio exceeds a threshold value within a threshold period of time. In this example, the Fourier coefficient can suddenly drop in accordance with the sudden drop in audio. Based on the determination of the issue associated with the media broadcast, storage of an associated, relevant portion of the media broadcast can be triggered, as further described herein.

In various embodiments, the media storage module 106 can cause a portion of a media broadcast to be stored. In general, a broadcast device can be associated with media capture capabilities that correspond with a quality of media that the broadcast device is capable of transmitting for broadcast. During a broadcast of media, an issue, such as a connectivity issue, can cause the media received by a broadcast server to be of an inferior quality compared to the quality of the media that the broadcasting device is capable of providing for broadcast. The media storage module 106 can cause to be stored a portion of the media broadcast associated with a time duration during which the issue with the media broadcast occurred. The stored portion of the media broadcast can be at the quality that the broadcast device is capable of broadcasting. The media storage module 106 can store portions of a media broadcast based on a buffer. As a broadcast device captures media and broadcasts a media broadcast, portions of the media broadcast can be stored in the buffer. The portions stored in the buffer can be the latest portions of the media broadcast. In some cases, the portions of the media broadcast can be stored in a rolling buffer (e.g., circular buffer, ring buffer). In the rolling buffer, the latest portions of the media broadcast replace the oldest portions of the media broadcast stored in the rolling buffer. In this way, the portions of the media broadcast stored in the rolling buffer are the latest portions of the media broadcast. When an issue associated with a broadcast of the media broadcast is determined, the media storage module 106 can cause the latest portions of the media broadcast from the rolling buffer to be stored, for example, in the data store 150*a*. The broadcast device 102 can provide the latest portion(s) of the media broadcast to the broadcast server 110 to allow the broadcast server 110 to repair a stored media broadcast before the stored media broadcast is provided on demand, as discussed in more detail herein. In some cases, an issue may affect a broadcast of a media broadcast for a period of time exceeding what can be stored in a buffer. In these cases, portions of the media broadcast in a buffer can be stored in a data store while the issue is determined.

The media storage module 106 can determine a size of a buffer so that portions of a media broadcast stored in the buffer are sufficient to repair a stored media broadcast. In some cases, there are delays between when an issue occurs, when the issue is determined, and when storage of a portion of a media broadcast from a buffer to a data store is triggered. The size of the buffer can be determined so that when the storage of the portion of the media broadcast from the buffer to the data store is triggered, portions of the media broadcast associated with when the issue occurs are available in the buffer. The size of the buffer can be determined based on various factors including network connection, geographic location, and historical data. For example, a size of a buffer associated with a broadcast over a poor network connection can be larger than a size of a buffer associated with a broadcast over a stronger network connection. As another example, a size of a buffer associated with a broadcast in a geographic location associated with a poor network connection can be larger than a size of a buffer associated with a broadcast in a geographic location associated with a stronger network connection. As another example, a size of a buffer associated with a broadcast from a broadcast device with a history of issues can be larger than a size of a buffer associated with a broadcast from a broadcast device with a history of fewer issues.

In some embodiments, the media storage module 106 can determine a size of a buffer based on a machine learning model that is trained to predict the appropriate size of a buffer for a broadcast device. A machine learning model can be trained based on training data that includes features, such as network connection, geographic location, and historical data, associated with broadcast devices. The training data can also include sizes of buffers associated with the broadcast devices and whether the sizes of the buffers were sufficient to repair a stored media broadcast. Positive training data can include features associated with broadcast devices and sizes of buffers associated with the broadcast devices that were sufficient to repair a stored media broadcast. Negative training data can include features associated with broadcast devices and sizes of buffers associated with the broadcast devices that were insufficient to repair a stored media broadcast. Once trained, the machine learning model can be provided with features associated with a broadcast device. A size of a buffer can be determined by the machine learning model, and the broadcast device can utilize the size determined by the machine learning model for its buffer.

In some cases, the media storage module 106 can change a size of a buffer associated with a broadcast device during the course of a broadcast. The size of the buffer can change based on changes in various factors associated with the broadcast. For example, during the course of a broadcast, a network connection associated with a broadcast device can decrease in available bandwidth. A size of a buffer associated with the broadcast device can be increased based on the decrease in available bandwidth. As another example, a broadcast device can track a time from when a packet is sent to a broadcast server to when an associated response from the broadcast server is received. A size of a buffer associated with the broadcast device can increase in size based on an increase in the time, or the size of the buffer can decrease in size based on a decrease in the time. Maintaining a sufficiently sized buffer during the course of a broadcast can make efficient use of resources available to a broadcast device while allowing portions of a media broadcast to be stored for repair of the media broadcast.

In various embodiments, the media repair module 114 can repair a stored media broadcast based on a stored portion of a media broadcast. A broadcast server can receive a media broadcast provided by a broadcast device. The broadcast server can transmit or broadcast the media broadcast to viewing devices as well as store the media broadcast provided by the broadcast device. An issue that occurs during the broadcast can result in a drop in quality in the media broadcast provided by the broadcast device, and the drop in quality is reflected in the stored media broadcast. The media repair module 114 can identify drops in quality in the stored media broadcast based on various processing techniques (e.g., post-processing techniques). For example, the media repair module 114 can determine anomalies in the stored media broadcast such as corrupted video, corrupted audio, dropped video, and dropped audio. The media repair module 114 can request from the broadcast device 102 portions of the media broadcast stored by the broadcast device 102 and associated with the anomalies. The request can be based on metadata, such as timestamps or frame numbers, associated with the media broadcast. For example, a media broadcast initiated by a broadcast device and stored by a broadcast server can have dropped video at a time t1. The dropped video at the time t1 can be determined in the stored media broadcast. The broadcast server can request a portion of the media broadcast corresponding to the time t1 from the broadcast device. The broadcast device can provide the portion of the media broadcast to the broadcast server. The provided portion of the media broadcast can be used to repair the dropped video in the stored media broadcast. The media repair module 114 can repair a stored media broadcast by replacing a portion of the stored media broadcast where an anomaly is determined with a portion of a media broadcast without the anomaly. Replacing the portion of the stored media broadcast can involve matching video frames or audio frames preceding or following the anomaly with, respectively, video frames or audio frames in the portion of the media broadcast without the anomaly. In some cases, metadata associated with a media broadcast can differ from metadata associated with a stored media broadcast. This may be a result of an issue during the media broadcast. In these cases, matching video frames or audio frames preceding or following an anomaly in the stored media broadcast can account for differences between the metadata associated with the media broadcast and the metadata associated with the stored media broadcast. After the stored media broadcast is repaired based on a portion of the media broadcast, the stored media broadcast can be provided for replay on demand without the anomaly.

Figure 2:
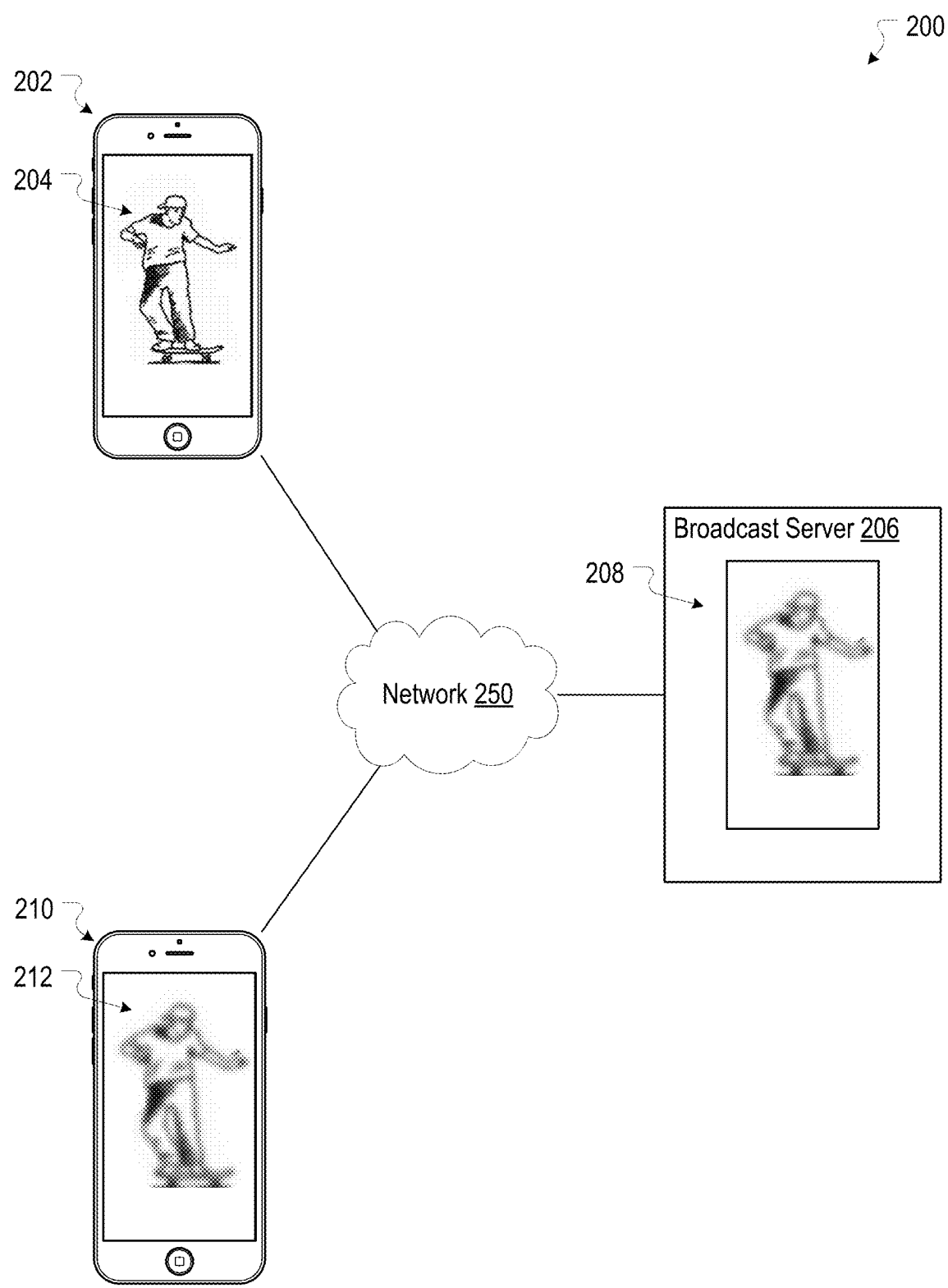
FIG. 2 illustrates an example system including a broadcast device, a broadcast server, and a viewing device, according to an embodiment of the present technology.

FIG. 2 illustrates an example scenario 200, according to an embodiment of the present technology. The example scenario 200 illustrates an example broadcast of a media broadcast that can be performed by the device issue detection module 104, the media storage module 106, the server issue detection module 112, and the media repair module 114 of FIG. 1. It should be understood that there can be additional, fewer, or alternative steps performed in similar or alternative orders, or in parallel, based on the various features and embodiments discussed herein unless otherwise stated.

In the example scenario 200, a broadcast device 202 captures and broadcasts media associated with a skateboarder. In some instances, the broadcast can be live or in real time (or near real time). The broadcast device 202 broadcasts the captured media 204 through a network 250 to a broadcast server 206. In the example scenario 200, an issue, such as a connectivity issue, causes received media 208 received by broadcast server 206 to experience a drop in quality when compared to the captured media 204. The broadcast server 206 broadcasts the received media 208 through the network 250 to a viewing device 210 and potentially a multitude of other viewing devices (not shown). The broadcast server 206 can store the received media 208 to provide to other devices on demand sometime after the broadcast. The broadcasted media 212 broadcasted to the viewing device 210 can include the same drop in quality of the received media 208 received by the broadcast server 206. Likewise, the other devices that access the received media 208 on demand sometime after the broadcast also can experience the same drop in quality. However, in accordance with the present technology, the drop in quality can be remedied and the received media 208 can be repaired. In the example scenario 200, the broadcast server 206 can determine the issue or the broadcast device 202 can determine the issue during the broadcast, and trigger storage of a portion of the captured media 204. The stored portion of the captured media 204 can be used to repair the received media 208. The other devices that access the received media 208 after the received media 208 is repaired do not experience the drop in quality. All examples herein are provided for illustrative purposes, and there can be many variations and other possibilities.

Figure 3:
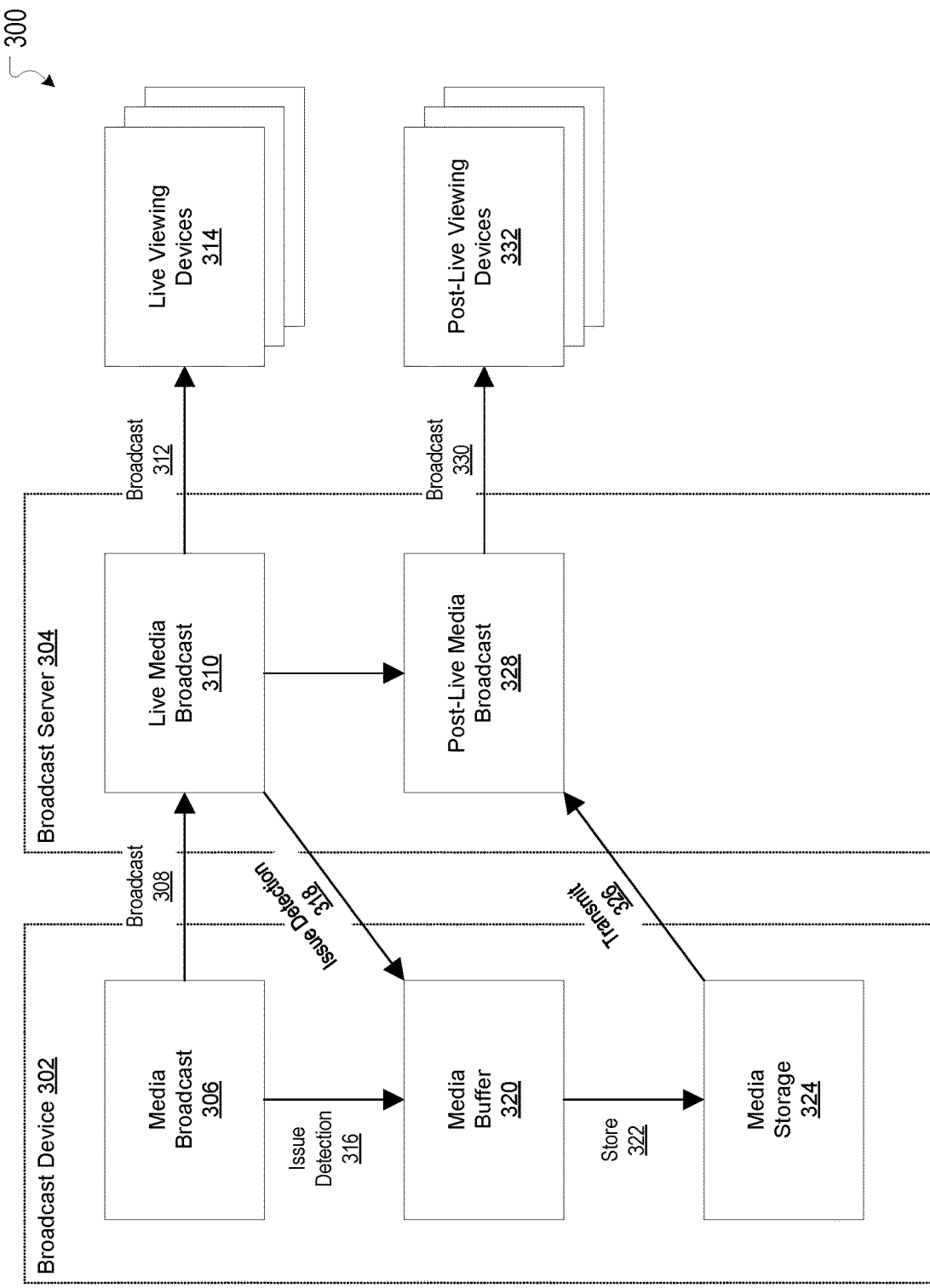
FIG. 3 illustrates an example functional block diagram, according to an embodiment of the present technology.

FIG. 3 illustrates an example functional block diagram 300, according to an embodiment of the present technology. The example functional block diagram 300 illustrates an example broadcast of a media broadcast that can be performed by the device issue detection module 104, the media storage module 106, the server issue detection module 112, and the media repair module 114 of FIG. 1. It should be understood that there can be additional, fewer, or alternative steps performed in similar or alternative orders, or in parallel, based on the various features and embodiments discussed herein unless otherwise stated.

In the example block diagram 300, a broadcast device 302 broadcasts live a media broadcast 306 to live viewing devices 314 via a broadcast server 304. More specifically, the broadcast device 302 broadcasts 308 the media broadcast 306 to the broadcast server 304. The broadcast server 304 then broadcasts 312 the live media broadcast 310 to the live viewing devices 314. In the example block diagram 300, the broadcast device 302 maintains a media buffer 320 that stores a recent portion of the media broadcast 306. In response to an issue detection 316 by the broadcast device 302, the media buffer 320 can store 322 the recent portion of the media broadcast 306 in a media storage 324. Alternatively, or in addition, the media buffer 320 can store 322 the recent portion of the media broadcast 306 in the media storage 324 in response to an issue detection 318 by the broadcast server 304. As described herein, an issue during the broadcast 308 of the media broadcast 306 to the broadcast server 304 can result in a drop in quality in the live media broadcast 310. At the end of the media broadcast 306, the broadcast server 304 can store the live media broadcast 310 as a post-live media broadcast 328 that is transmitted or broadcast 330 to post-live viewing devices 332. The portion of the media broadcast 306 in the media storage 324 is transmitted 326 to the broadcast server 304 to repair the post-live media broadcast 328. Repairing the post-live media broadcast 328 with the portion of the media broadcast 306 transmitted 326 to the broadcast server 304 allows the post-live media broadcast to remedy the drop in quality in the live media broadcast 310. As a result, the post-live media broadcast 328 broadcast 330 to the post-live viewing devices 332 does not include the drop in quality in the live media broadcast 310. All examples herein are provided for illustrative purposes, and there can be many variations and other possibilities.

Figure 4A:
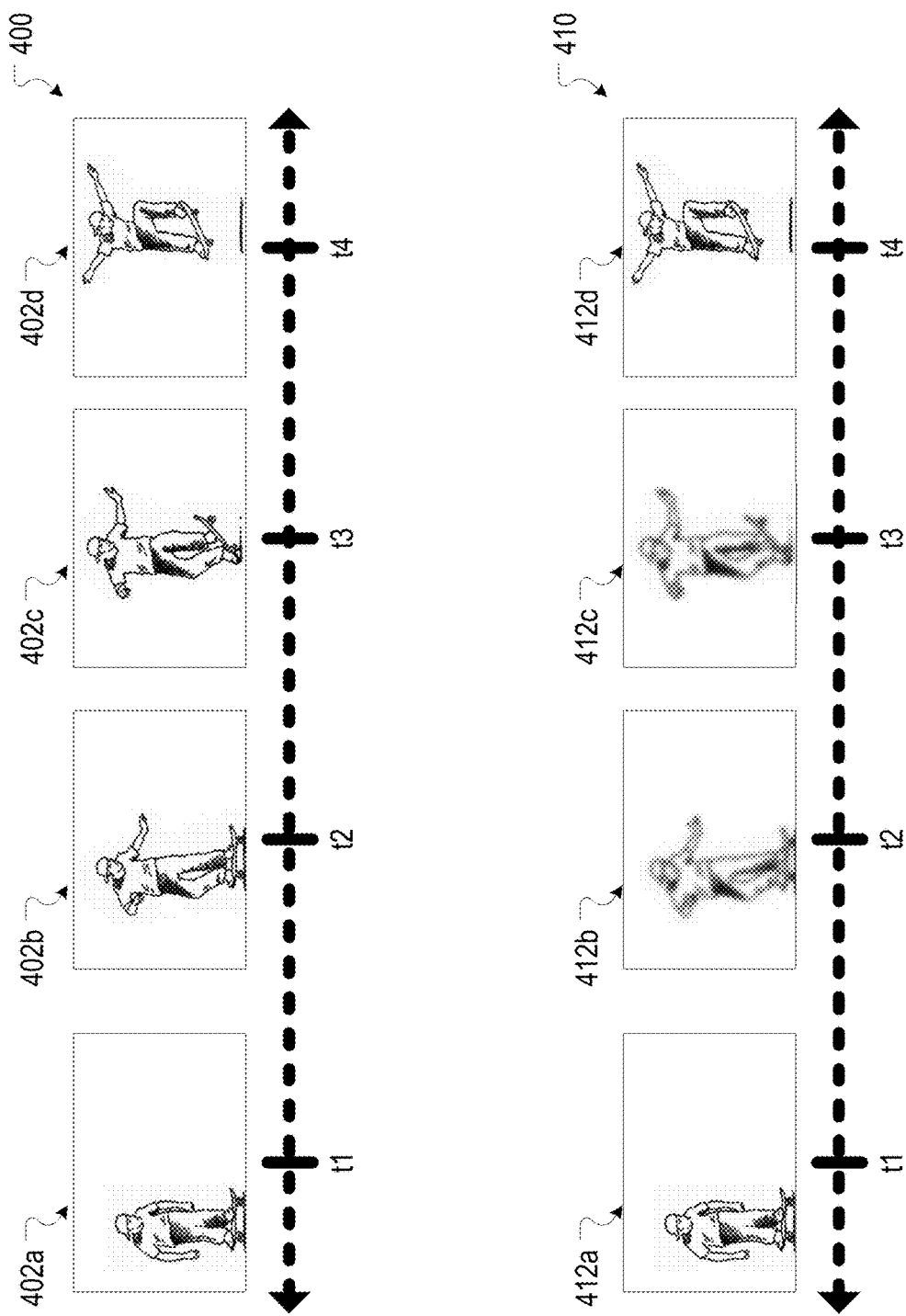
Figure 4C:
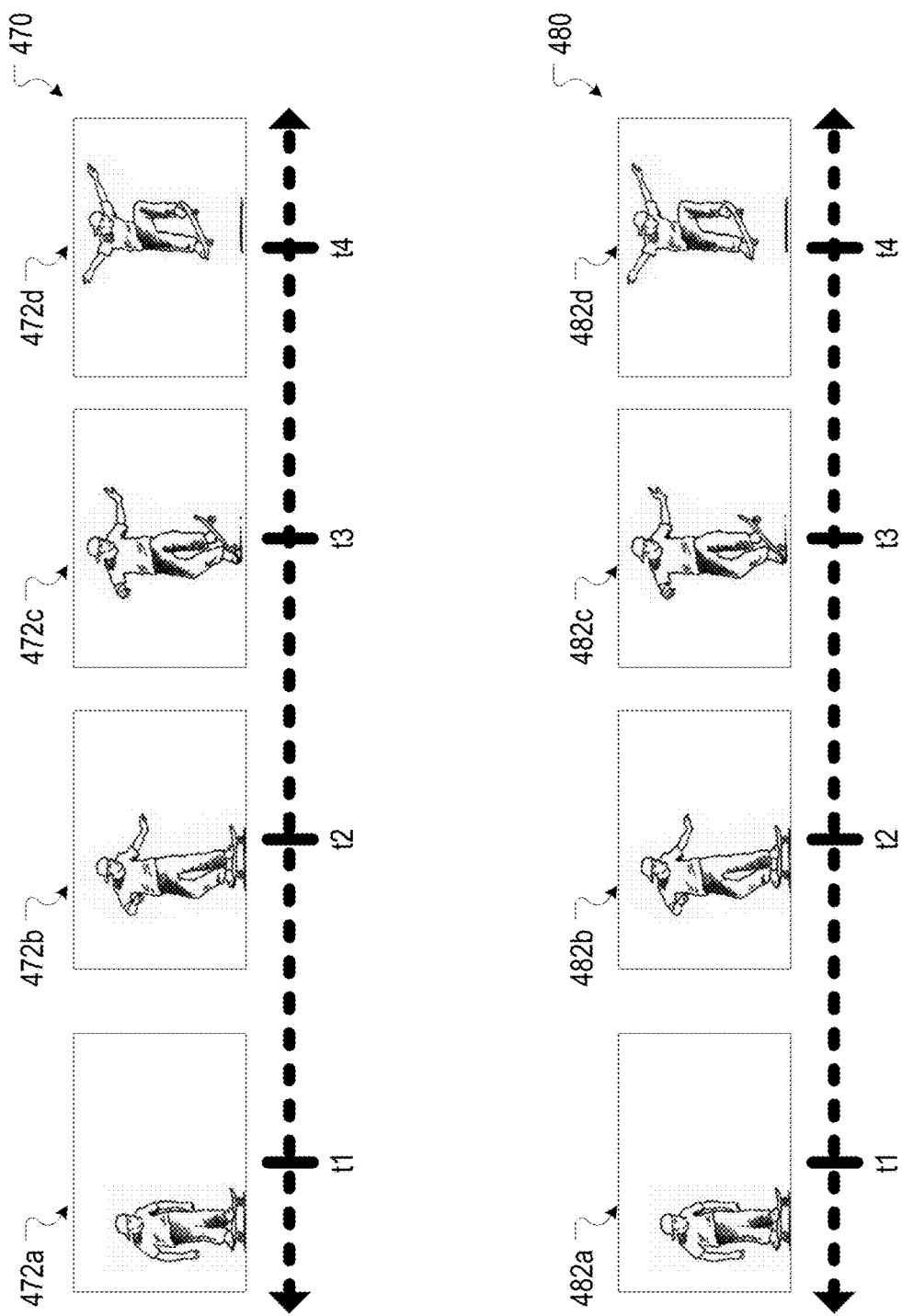

FIG. 4A-4C illustrate example media broadcasts and example stored media broadcasts, according to an embodiment of the present technology. The example media broadcasts and the example stored media broadcasts can be associated with one or more functionalities performed by the device issue detection module 104, the media storage module 106, the server issue detection module 112, and the media repair module 114 of FIG. 1. It should be understood that there can be additional, fewer, or alternative steps performed in similar or alternative orders, or in parallel, based on the various features and embodiments discussed herein unless otherwise stated.

FIG. 4A illustrates an example media broadcast 400 and an example stored media broadcast 410. The media broadcast 400 can be broadcast, for example, from a broadcast device to a broadcast server. The media broadcast 400 includes frames 402a, 402b, 402c, and 402d associated with times t1, t2, t3, and t4, respectively. During the broadcast of the media broadcast 400, an issue can cause a drop in quality in what is broadcasted. The drop in quality is reflected in the stored media broadcast 410. The stored media broadcast 410 includes frames 412a, 412b, 412c, and 412d associated with times t1, t2, t3, and t4, respectively. The frames 412a, 412b, 412c, and 412d of the stored media broadcast 410 correspond with, respectively, frames 402a, 402b, 402c, and 402d of the media broadcast 400. As illustrated in this example, the drop in quality is reflected in frames 412b and 412c. The drop in quality in frames 412b and 412c can be remedied by repairing a portion of the stored media broadcast 410 associated with the issue based on a portion of the media broadcast 400.

FIG. 4B illustrates an example media broadcast 440 and an example stored media broadcast 450. The media broadcast 440 can be, for example, the media broadcast 400 of FIG. 4A, and the stored media broadcast 450 can be, for example, the stored media broadcast 410 of FIG. 4A. The media broadcast 440 includes frames 442a, 442b, 442c, and 442d associated with times t1, t2, t3, and t4, respectively. During the broadcast of the media broadcast 440, a buffer 444 can store recent portions of the media broadcast 440. During the broadcast, an issue associated with times t2 and t3 can be determined. In response to the determination of the issue, portions of the media broadcast 440 stored in the buffer 444 can be stored, for example, in a data store. As illustrated in this example, portions 446a and 446b of the media broadcast 440 are stored from the buffer 444 to a data store. In the stored media broadcast 450, frames 452a, 452b, 452c, and 452d are associated with times t1, t2, t3, and t4, respectively. The frames 452a, 452b, 452c, and 452d of the stored media broadcast 450 correspond with, respectively, the frames 442a, 442b, 442c, and 442d of the media broadcast 440. As illustrated in this example, portion 454 of the stored media broadcast 450 reflects a drop in quality associated with the issue. The drop in quality is also reflected in frames 452b and 452c of the stored media broadcast 450. In this example, portions 446a and 446b of the media broadcast are requested to repair the portion 454 of the stored media broadcast 450. The portion 454 of the stored media broadcast 450 can be repaired, for example, by replacing frames in the portion 454, including frames 452b and 452c, with the frames 442b and 442c in the portions 446a and 446b of the media broadcast.

FIG. 4C illustrates an example media broadcast 470 and an example stored media broadcast 480. The media broadcast 470 can be, for example, the media broadcast 400 of FIG. 4A or the media broadcast 440 of FIG. 4B, and the stored media broadcast 470 can be, for example, the stored media broadcast 410 of FIG. 4A or the stored media broadcast 450 of FIG. 4B. In this example, the stored media broadcast 480 has been repaired based on a portion of the media broadcast 470. The media broadcast 470 includes frames 472a, 472b, 472c, and 472d associated with times t1, t2, t3, and t4, respectively. The stored media broadcast 480 includes frames 482a, 482b, 482c, and 482d associated with times t1, t2, t3, and t4, respectively. As illustrated in this example, after the stored media broadcast 480 has been repaired based on the portion of the media broadcast 470, there is no drop in quality reflected in the stored media broadcast 480. The frames 482a, 482b, 482c, and 482d of the stored media broadcast 480 correspond with, respectively, the frames 472a, 472b, 472c, and 472d of the media broadcast 470 and reflect the same quality. All examples herein are provided for illustrative purposes, and there can be many variations and other possibilities.

Figure 5:
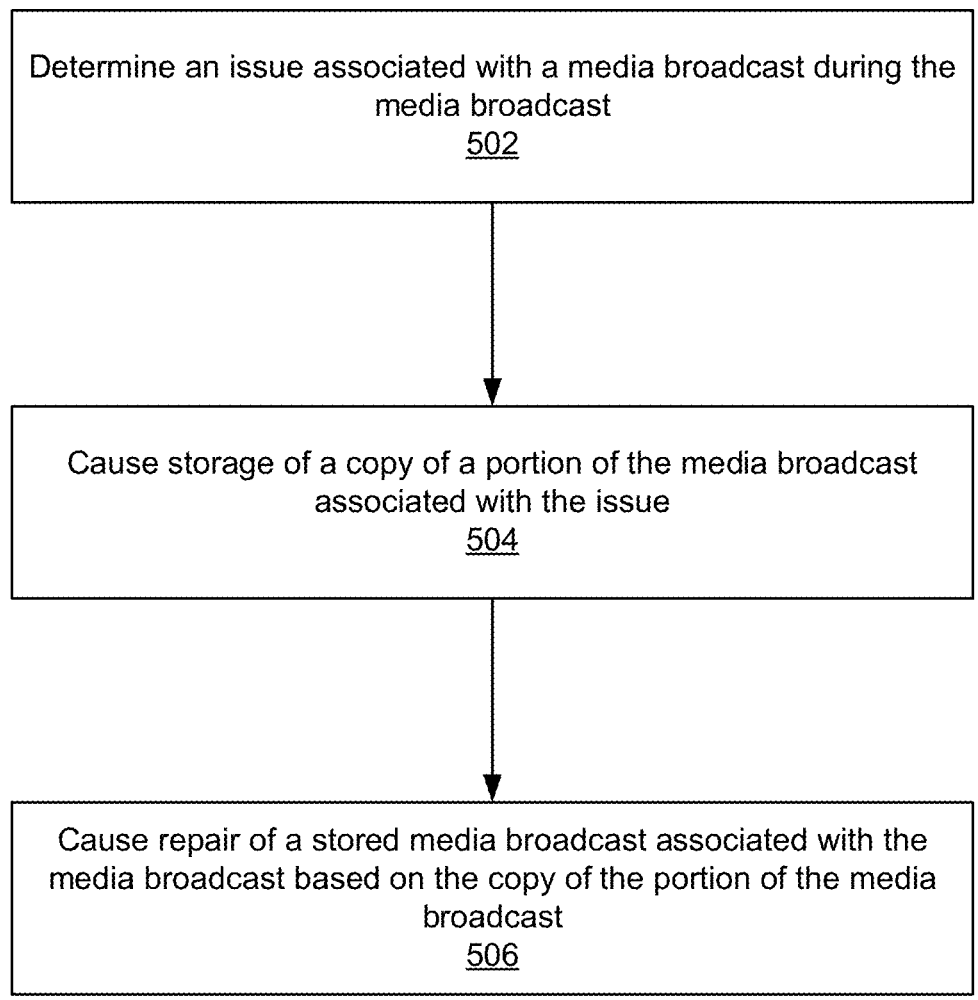
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the example method 500 can determine an issue associated with connectivity of a media broadcast during the media broadcast. At block 504, the example method 500 can cause storage of a copy of a portion of the media broadcast associated with the issue. At block 506, the example method 500 can cause repair of the media broadcast based on the copy of the portion of the media broadcast.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
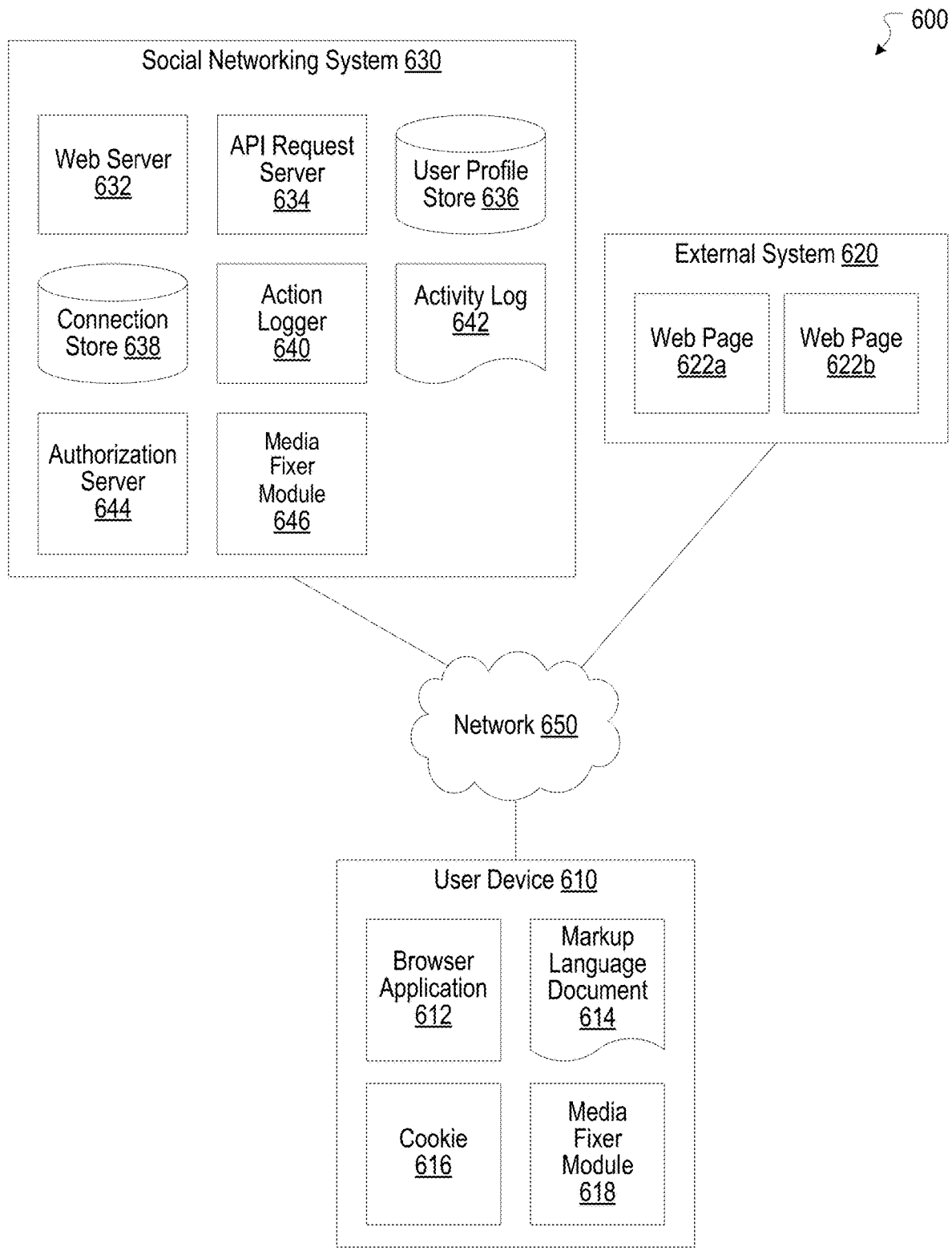
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a media fixer module 646. The media fixer module 646 can be implemented with, for example, the server issue detection module 112 and the media repair module 114, as discussed in more detail herein. In some embodiments, the user device 110 can include a media fixer module 618. The media fixer module 618 can be implemented with, for example, the device issue detection module 104 and the media storage module 106, as discussed in more detail herein. In some embodiments, functionality of the media fixer module 646 can be performed by the user device 110 and functionality of the media fixer module 618 can be performed by the social networking system 630. It should be appreciated that there can be many variations or other possibilities.

Hardware Implementation

Figure 7:
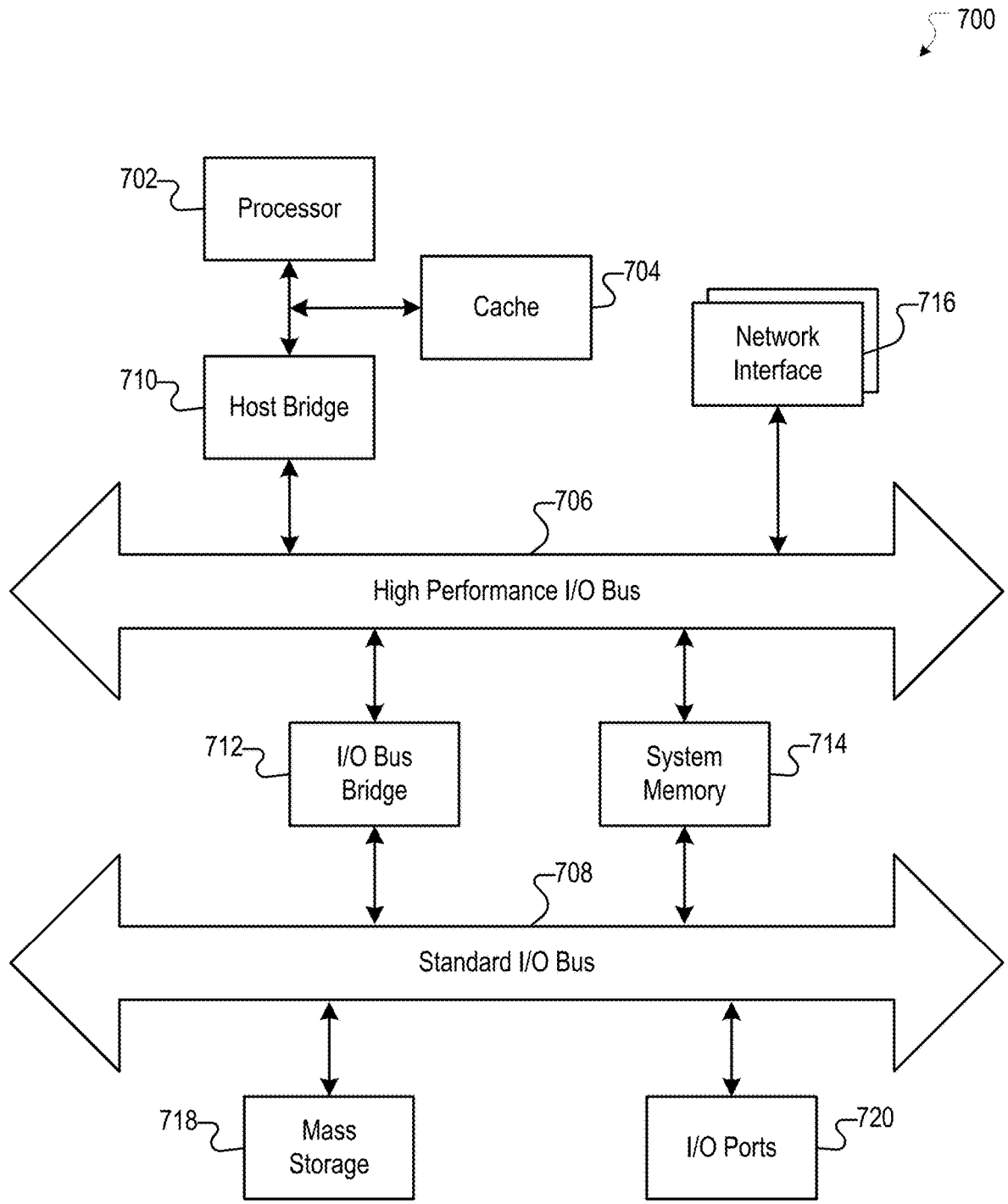
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
determining, by a computing system, an issue associated with transmission quality of a media broadcast during the media broadcast based on a difference in audio levels in the media broadcast within a threshold period of time;
causing, by the computing system, storage of a copy of a portion of media captured for the media broadcast that is in a buffer of a device that captured the media when the issue associated with the transmission quality of the media broadcast is determined; and
causing, by the computing system, repair of a stored media broadcast associated with the media broadcast based on the copy of the portion of the media captured for the media broadcast.

2. The computer-implemented method of claim 1, wherein the determining the issue associated with the transmission quality of the media broadcast is further based on a difference between a number of packets sent by a broadcasting device and a number of packets received by a broadcasting server exceeding a threshold number of packets.

3. The computer-implemented method of claim 1, wherein the determining the issue associated with the transmission quality of the media broadcast is further based on a network connection associated with the media broadcast failing to satisfy a threshold connection quality.

4. The computer-implemented method of claim 1, wherein the determining the issue associated with the transmission quality of the media broadcast is further based on a determination of a drop in quality of the media broadcast.

5. The computer-implemented method of claim 1, wherein the storage of the copy of the portion of the media captured for the media broadcast is associated with a rolling buffer that stores the portion of the media broadcast.

6. The computer-implemented method of claim 5, wherein a size of the rolling buffer is determined based on at least one of: a network connection, a geographic location, or historical data associated with the computing system.

7. The computer-implemented method of claim 6, wherein the size of the rolling buffer changes during the media broadcast based on a change in available bandwidth.

8. The computer-implemented method of claim 1, wherein the repair of the stored media broadcast includes matching frames of the stored media broadcast with frames of the copy of the portion of the media captured for the media broadcast.

9. The computer-implemented method of claim 1, wherein the repair of the stored media broadcast includes replacing frames of the stored media broadcast with frames of the copy of the portion of the media captured for the media broadcast.

10. The computer-implemented method of claim 1, wherein the device that captured the media is in communication with a broadcast server and the issue associated with the transmission quality of the media broadcast is a connectivity issue associated with the communication with the broadcast server.

11. A system comprising:
at least one processor; and
a memory storing instructions that, when executed by the at least one processor, cause the system to perform a method comprising:
determining an issue associated with transmission quality of a media broadcast during the media broadcast based on a difference in audio levels in the media broadcast within a threshold period of time;
causing storage of a copy of a portion of media captured for the media broadcast that is in a buffer of a device that captured the media when the issue associated with the transmission quality of the media broadcast is determined; and
causing repair of a stored media broadcast associated with the media broadcast based on the copy of the portion of the media captured for the media broadcast.

12. The system of claim 11, wherein the determining the issue associated with the transmission quality of the media broadcast is further based on a difference between a number of packets sent by a broadcasting device and a number of packets received by a broadcasting server exceeding a threshold number of packets.

13. The system of claim 11, wherein the determining the issue associated with the transmission quality of the media broadcast is further based on a network connection associated with the media broadcast failing to satisfy a threshold connection quality.

14. The system of claim 11, wherein the determining the issue associated with the transmission quality of the media broadcast is further based on a determination of a drop in quality of the media broadcast.

15. The system of claim 11, wherein the storage of the copy of the portion of the media captured for the media broadcast is associated with a rolling buffer that stores the portion of the media broadcast.

16. A non-transitory computer-readable storage medium including instructions that, when executed by at least one processor of a computing system, cause the computing system to perform a method comprising:
determining an issue associated with transmission quality of a media broadcast during the media broadcast based on a difference in audio levels in the media broadcast within a threshold period of time;
causing storage of a copy of a portion of media captured for the media broadcast that is in a buffer of a device that captured the media when the issue associated with the transmission quality of the media broadcast is determined; and
causing repair of a stored media broadcast associated with the media broadcast based on the copy of the portion of the media captured for the media broadcast.

17. The non-transitory computer-readable storage medium of claim 16, wherein the determining the issue associated with the transmission quality of the media broadcast is further based on a difference between a number of packets sent by a broadcasting device and a number of packets received by a broadcasting server exceeding a threshold number of packets.

18. The non-transitory computer-readable storage medium of claim 16, wherein the determining the issue associated with the transmission quality of the media broadcast is further based on a network connection associated with the media broadcast failing to satisfy a threshold connection quality.

19. The non-transitory computer-readable storage medium of claim 16, wherein the determining the issue associated with the transmission quality of the media broadcast is further based on a determination of a drop in quality of the media broadcast.

20. The non-transitory computer-readable storage medium of claim 16, wherein the storage of the copy of the portion of the media captured for the media broadcast is associated with a rolling buffer that stores the portion of the media broadcast.

\* \* \* \* \*